United States Patent
Shih (10) Patent No.: US 8,902,421 B2
(45) Date of Patent: Dec. 2, 2014

(54) METHOD AND SYSTEM FOR ACTIVE-ILLUMINATION PARALLEL RAMAN MICROSPECTROSCOPY

(71) Applicant: The University of Houston System, Houston, TX (US)

(72) Inventor: Wei-Chuan Shih, Houston, TX (US)

(73) Assignee: The University of Houston System, Houston, TX (US)

( * ) Notice: Subject to any disclaimer, the term of this patent is extended or adjusted under 35 U.S.C. 154(b) by 0 days.

(21) Appl. No.: 13/741,277

(22) Filed: Jan. 14, 2013

(65) Prior Publication Data

US 2014/0029003 A1 Jan. 30, 2014

Related U.S. Application Data

(60) Provisional application No. 61/585,927, filed on Jan. 12, 2012.

(51) Int. Cl.
*G01J 3/44* (2006.01)
*G01J 3/02* (2006.01)

(52) U.S. Cl.
CPC . *G01J 3/44* (2013.01); *G01J 3/0229* (2013.01)
USPC .......................................... 356/301

(58) Field of Classification Search
CPC ...................................... G01N 21/65
USPC .......................................... 356/301
See application file for complete search history.

(56) References Cited

U.S. PATENT DOCUMENTS

| | | | |
|---|---|---|---|
| 5,440,669 A * | 8/1995 | Rakuljic et al. | 359/7 |
| 8,310,671 B1 * | 11/2012 | Nguyen et al. | 356/301 |
| 2007/0258088 A1 * | 11/2007 | Silberberg et al. | 356/301 |
| 2008/0006615 A1 * | 1/2008 | Rosario et al. | 219/121.68 |
| 2009/0093799 A1 * | 4/2009 | Davenport et al. | 606/9 |
| 2010/0261280 A1 * | 10/2010 | Black et al. | 436/50 |
| 2010/0327866 A1 * | 12/2010 | Albu et al. | 324/304 |
| 2011/0309247 A1 * | 12/2011 | Azimi et al. | 250/339.01 |
| 2012/0319005 A1 * | 12/2012 | Robertson | 250/458.1 |

* cited by examiner

*Primary Examiner* — Tarifur Chowdhury
*Assistant Examiner* — MD Rahman
(74) *Attorney, Agent, or Firm* — Jackson Walker L.L.P.

(57) ABSTRACT

An active-illumination parallel Raman microspectroscopy scheme for simultaneously collecting Raman spectra from multiple points in a full-spectra range. A combination of multi-point laser illumination with wide-field Raman imaging is employed in order to allow for simultaneous imaging of multiple points not aligned on a single line.

12 Claims, 9 Drawing Sheets

METHOD AND SYSTEM FOR ACTIVE-ILLUMINATION PARALLEL RAMAN MICROSPECTROSCOPY

RELATED APPLICATIONS

This application claims priority to U.S. Provisional Patent Application Ser. No. 61/585,927, filed Jan. 12, 2012, which is hereby incorporated by reference for all purposes.

FIELD OF THE INVENTION

Embodiments of the present invention relate to a method and process for exciting Raman scattering from a sample and simultaneously colleting Raman spectra from multiple points.

BACKGROUND

Generally speaking, Raman spectroscopy can provide molecular information via inelastic light scattering without physical contact. Coupled with microscopic imaging, Raman spectroscopy is a powerful technique for compositional analysis via inelastic light scattering. Raman microspectroscopy can be utilized for material analysis in many different ways that can include, for example, stress and temperature measurement in silicon and compositional analysis of polymer microparticles. Raman spectroscopy is particularly useful in obtaining microscopic information over a sizable area without physical contact, thereby enabling compositional analysis with little or no sample preparation. However, conventional laser scanning confocal Raman microscopy requires long data acquisition time due to its sequential operation, as well as the additional latency from the readout time of low-noise charge coupled device (CCD) detectors. As a result, conventional point-scan Raman mapping speed is about one to a few points per second, or a few Hertz.

Three methodologies are commonly employed in contemporary Raman microspectroscopy, namely, point-scan, line-scan, and global illumination. The point-scan operation involves the collection of Raman spectra in a point-by-point fashion. Since Raman scattering is a relatively weak phenomenon, the laser spot dwelling time at each point is typically on the order of milliseconds to seconds. In addition, the data needs to be read-out after each point acquisition, which may another few hundred milliseconds for a standard charge-coupled device (CCD) detector. As a result, conventional point-scan Raman mapping is a time-consuming process and, for example, can take as long as a few hours to map a 50×50 µm² region.

To improve efficiency, parallel acquisition has been implemented based on time-sharing or power-sharing schemes. In the former, the laser is rapidly scanned over multiple points of interest during the time of a single CCD recording frame. In the latter, the laser is shaped into an elongated line and the entire line is imaged by a single CCD frame. Thus, both schemes can substantially reduce multiple read-out times. A key difference, however, lies in the temporal power fluctuation within a CCD frame. For time-sharing, the total laser power is focused on one spot at any given time but for power-sharing the laser power is distributed on all spots. Therefore, the frame-averaged power is identical to the instantaneous power for power-sharing but not for time-sharing. Another significant difference is there is no scanning within each frame for power-sharing. Recently, the time-sharing approach has been demonstrated to provide flexibility for imaging multiple points not aligned on a line, which is particularly advantageous for sparse samples such as bacteria or environmental particles.

To achieve a speed beyond 100 Hz, rapid point scanning may be employed in state-of-the-art commercial Raman systems with the use of electron-multiplied CCD (EMCCD) detectors. Although EMCCD can effectively overcome the read noise due to the short integration time per point measurement (~msec), substantial noise is generated during the multiplication process. In addition, the throughput advantage can be severely undermined for common specimens, where the Raman scattering cross section is typically small, and thus requires much longer integration time to achieve a decent signal-to-noise ratio. In contrast, parallel acquisition using, for example, a line-shaped laser pattern can achieve similar throughput without the need for an EMCCD. Raman photons originating from the entire line, equivalent to many spots, are imaged to the entrance slit of a spectrograph, dispersed, and captured by a single CCD frame. Two-dimensional mapping is achieved by scanning the laser line in the transverse direction. Although efficient, the line-scan approach suffers from a major limitation: parallelism is only possible for points lying on a line, which severely undermines its throughput advantage when sparse sampling is desired.

BRIEF SUMMARY

The present disclosure relates in general to a parallel Raman spectroscopy scheme for simultaneously collecting Raman spectra from multiple points. The disclosed scheme is a high-throughput, sparse-sampling compositional microanalysis scheme using patterned illumination Raman imaging.

The described scheme is realized by projecting a multiple-point laser illumination pattern using a spatial light modulator (SLM) 106 and a wide-field Raman imaging collection. The scheme allows for the simultaneous imaging of multiple points not aligned on a line. A programmable multi-point laser illumination may be combined with wide-field Raman imaging in order to achieve an improved sampling flexibility while maintaining parallel acquisition efficiency, high laser power duty cycle on all spots, and the non-scanning nature within a single CCD frame.

BRIEF DESCRIPTION OF THE DRAWINGS

The invention can be better understood with reference to the following detailed description together with the illustrative drawings.

FIGS. 4(*a*), 4(*b*), 4(*c*). 20-, 30- and 40-point illumination patterns: (a) half-sine; (b) full-sine; and (c) triangular patterns using the Raman peak of Si @ 520 $cm^{-1}$.

FIGS. 5(*a*), 5(*b*), 5(*c*). (a) Visual image of mixed population of PS and PMMA; (b) laser spots from pattern #5 overlaid with the visual image; (c) identification of PS and PMMA microparticles.

DETAILED DESCRIPTION OF THE INVENTION

Embodiments of the present invention relate to a method and process for multi-point, full-spectral Raman imaging.

Generally speaking, the present invention discloses a method and system for parallel Raman microspectroscopy. In some embodiments, the system configuration (shown in FIG. 1) consists of a laser 100, a laser line filter 102, a beam expander 104, a spatial light modulator (SLM) 106, a mirror(s) 108, a tube lense(s) 110, a device 112, a dichroic beamsplitter 114, a long-wave pass filter 116, and a spectrograph 118.

Figure 1:
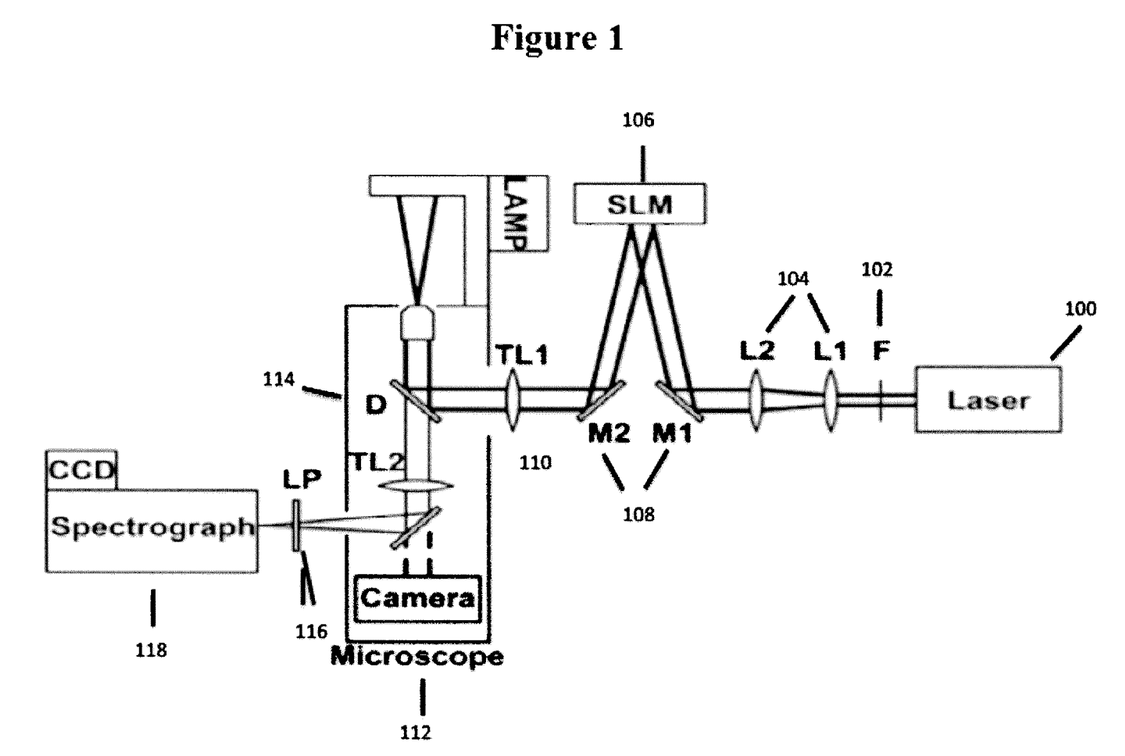
FIG. 1. Exemplary system configuration: laser 100; laser line filter (F) 102; beam expander (L1/L2) 104; spatial light modulator (SLM) 106; mirrors (M1/M2) 108; tube lenses (TL1/TL2) 110; dichroic beamsplitter (D) 114; long-wave pass filter (LP) 116; and spectrograph 118.

In some embodiments, the laser 100 may be selected based upon the specific needs of the application. Generally, the wavelengths of the laser 100 may vary between 300-900 nm but can be higher or lower depending on the sample and needs of the application being performed.

In other embodiments the SLM may be a phase hologram. The device 112 may be an upright or inverted microscope. The device 112 may contain an objective, a tube lense(s) 110, a dichroic beamsplitter 114, and a mirror(s) 108.

In one embodiment, the system begins operation by exciting a Raman scattering from the sample utilizing a laser 100. The output of said laser 100 is filtered by a laser-line filter 102 and expanded by the beam expander 104 to roughly the size of the SLM active pixel area before the SLM. The SLM transforms the uniform laser illumination into spot patterns via diffraction. The output from the SLM is then fed through the back port of a device 112 via a pair of lenses and imaged at the sample. A dichroic mirror 108 is placed in the device 112 for epi-Raman acquisition and is utilized to reflect the laser beam upward toward the specimen. The dichroic mirror 108 is designed to be a mirror at the laser wavelength while acting as a transparent glass at Raman wavelengths. An additional mirror 108 may be located in the device 112 in order to reflect the Raman light toward the spectrograph 118 component. The Raman light is then redirected out via the device 112 side port, filtered by a long-wave pass filter 116, and sent into a spectrograph 118 with a thermal-electrically cooled CCD camera. The laser line filter 102 is utilized in this process to make the laser light very pure at its desired wavelength.

In some embodiments, the spectrograph 118 has a diffracting grating between two lenses to disperse different wavelengths toward different directions in order to be recorded at different CCD pixels. In other embodiments the long-pass filter 116 is to reduce laser light from entering into the CCD, thereby becoming a strong background. The long-pass filter 116, in other embodiments, could be replaced by a notch filter that attenuates laser wavelength while permitting other wavelengths to pass.

The utilized mirrors 108 may be switched. When removed from the light path, the lamp source on the top of the objective can be used with the bottom camera to record brightfield images.

The brightfield image, in some embodiments, is taken first and analyzed to extract features of interest. The Fourier transform of the features of interest image is then supplied to the as the SLM input. In yet another embodiment, developed code is used to program the SLM to generate illumination patterns. The image generation, data acquisition, and pattern generations can be synchronized by Labview™ (Trademark of National Instruments Corp.).

Microparticles being analyzed can vary in characteristics, being either densely packed or sparsely distributed and be at different depths.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

EXAMPLES

Example 1

The system configuration is shown in FIG. 1. The 785 nm output of a CW Titanium:Sapphire laser (Spectra-Physics 3900S) was filtered by a laser-line filter (Semrock LL01-785-12.5) and expanded to ~1 cm in diameter before the spatial light modulator (SLM, LCOS Hamamatsu). The output from the SLM was fed through the back port of an inverted microscope (Olympus IX71) with an addition of a tube lens. A dichroic mirror (Semrock LPD01-785RU-25) was placed in the microscope turret for epi-Raman acquisition via a microscope objective (Olympus UPLSAPO 60XW, 1.2 NA). The Raman light was redirected out via the microscope side port, filtered by a long-wave pass filter (Semrock LP02-785RS-25), and sent into a spectrograph (Acton 300i) with a thermal-electrically cooled CCD camera (Princeton 400BR-excelon). Developed code was used to program the SLM to generate illumination patterns. The CCD data acquisition and the SLM pattern generation were synchronized by Labview (National Instrument).

Figure 2:
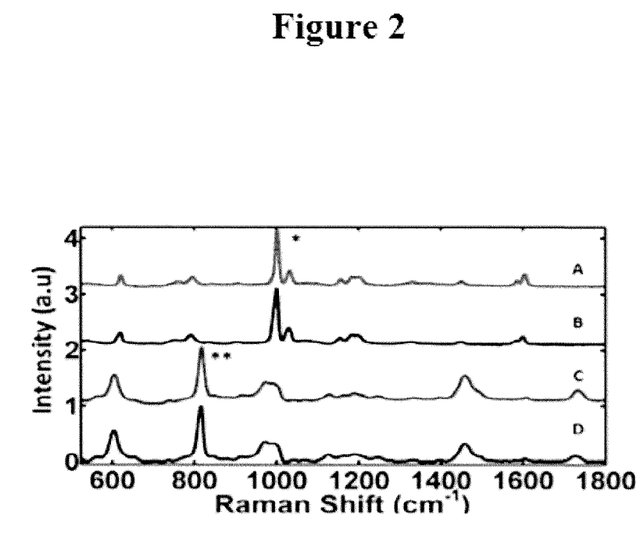
FIG. 2. Raman spectra of PS (A) and PMMA (C) measured using the proposed system vs. PS (B) and PMMA (D) measured by a confocal Raman system with spectral resolution ~8 $cm^{-1}$.
Figure 3:
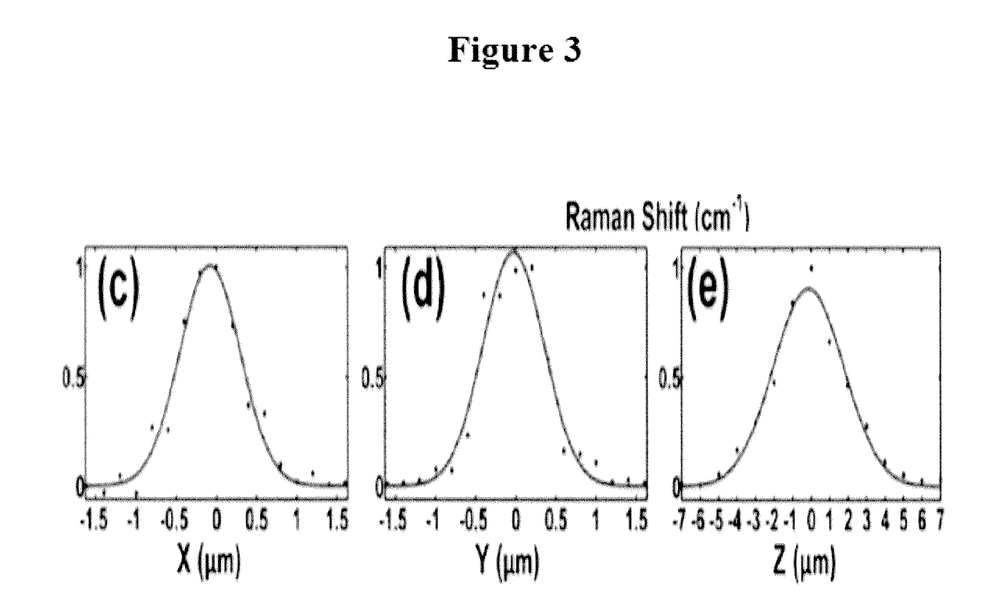
FIG. 3. Spatial resolution of Raman shift shown in FIG. 2 in (c) x, (d) y and (e) z direction.

The spectral resolution of the system was ~8 $cm^{-1}$ by comparing spectra taken by this system and a calibrated confocal Raman system, respectively. As shown in FIG. 2, the Raman spectra of polystyrene (PS) and polymethylmethacrylate (PMMA) were measured by both systems and no appreciable differences were noticed. The spatial (x-y-z) resolution is ~0.9, 0.9 and 4.5 µm, respectively at 785 nm excitation using 0.5 µm PS beads fixed on a glass coverslip (FIG. 3(c-e)).

Figure 4:
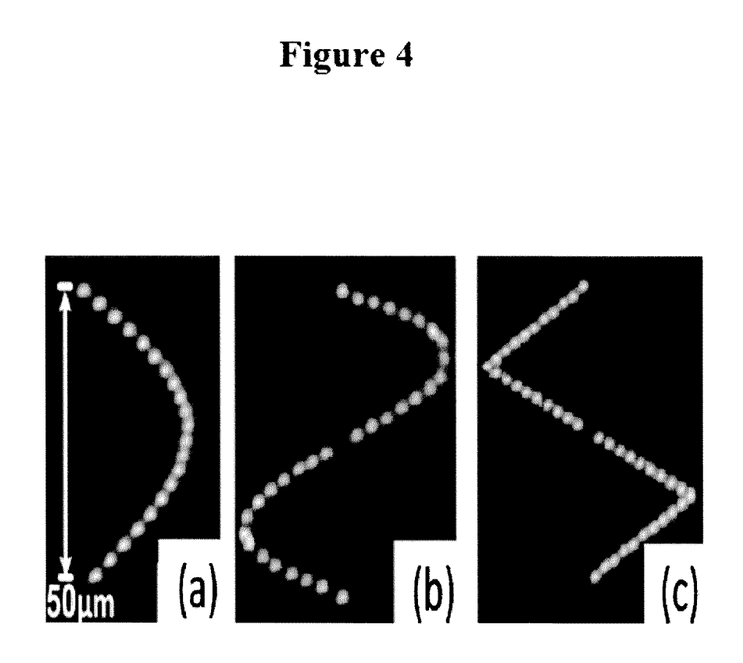

A uniform silicon sample was first used. The patterns shown in FIG. 4(a)-(c) are the raw image cropped from the 520 $cm^{-1}$ silicon Raman peak region after polynomial-based background removal. Since there are no other Raman features near this peak, these Raman images appear to be identical to the illumination pattern with slight additional spread in the x direction due to dispersion. A design constraint on the illumination pattern is that no two points are allowed to completely overlap along the direction perpendicular to the grating dispersion direction, preventing data mixing from adjacent points.

Figure 5:
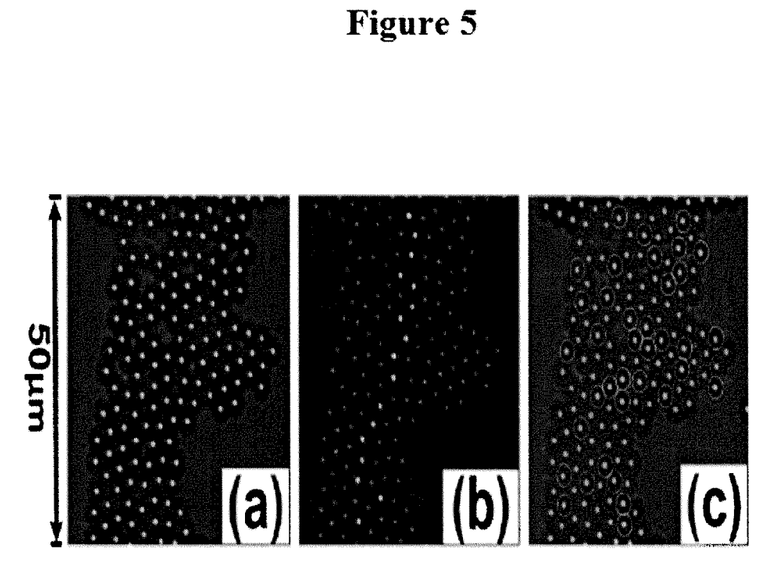

Next, a mixed population of a total of 138 PS and PMMA microparticles (each 3 μm in diameter, Sigma-Aldrich) were analyzed. A snap-shot visual image in FIG. 5(a) shows little difference between them even though the index of these two materials are quite different (PS 1.55-1.59; PMMA ~1.49). Using a centroid finding algorithm over the snap-shot image, the center of individual microparticles was first idenitifed. Then the centroids were grouped into 11 sub-groups, resulting in 11 patterns as the SLM input. For example, pattern #5 is shown in FIG. 5(b) with the laser spots overlaid with 17 microparticles. After collecting the Raman spectra from all microparticles, chemical identification can be made by using the characteristic Raman features of PS and PMMA, e.g., the peaks marked out in FIG. 2 with results shown in FIG. 5(c) where PS beads are marked red. Note that due to the relatively large size of the particles compared to the laser spot size, more patterns are needed to satisfy the no overlapping constraint mentioned earlier. With smaller particles, the current field of view (~60×60 μm$^2$) would allow ~30 points per pattern without overlapping.

Figure 6:
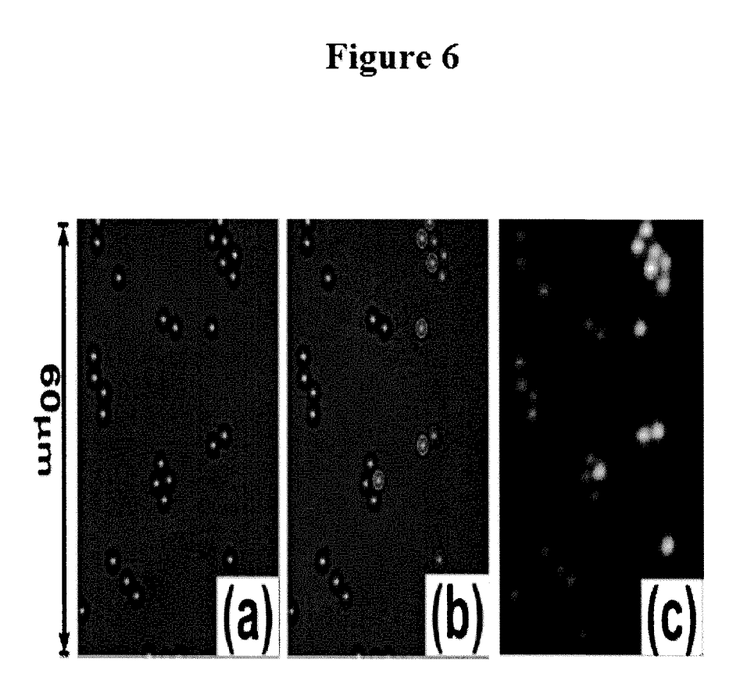
FIGS. 6(a), 6(b), 6(c). (a) Visual image of 28 PS microparticles; (b) grouping scheme for the 3 projected patterns (17-6-5) overlaid with the visual image; (c) resulting overlaid Raman image from three illumination patterns.

The previous example demonstrates a scenario when the microparticles are densely packed. A different sample with sparse particle distribution (28 PS particles) as shown in FIG. 6(a) was then prepared. Following a similar scheme, complete chemical identification can achieved using 3 patterns. FIG. 6(b) shows the grouping scheme for the three illumination patterns. FIG. 6(c) shows the corresponding Raman image using the PS Raman peak at 1001 cm$^{-1}$ by overlaying all three frames. Note that the first illumination pattern has 17 points and each one is significantly dimmer than those in the second (6 points) and the third (5 points) patterns. This is due to the laser power distribution among more points.

Figure 7:
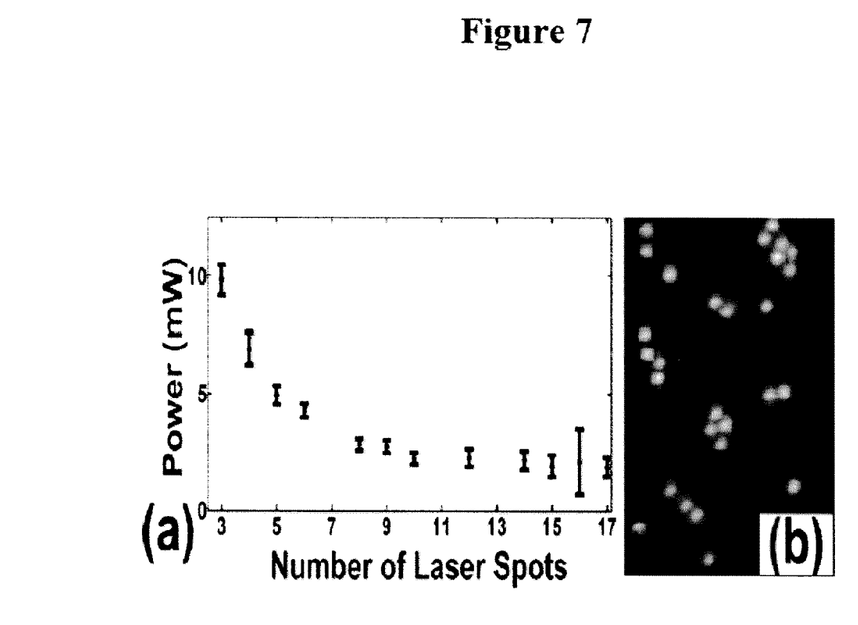
FIGS. 7(a), 7(b). (a) Average intensity and standard deviation versus the number of laser spots in the 11 SLM patterns employed in FIG. 4; (b) intensity corrected Raman image corresponding to the raw image in FIG. 5(c).

Next the laser power uniformity was assessed within each pattern and across patterns with different number of points by measuring the total laser power on the sample as well as silicon Raman peak (@ 520 cm$^{-1}$) intensity. FIG. 7(a) shows the average power and standard deviation per point versus the number of points in the 11 SLM patterns employed in FIGS. 5(a)-(c) with the same total laser power (100 mW before the SLM; ~30 mW at the sample). A gradual decrease in power per point was observed when more points are included in the illumination pattern.

The silicon data in FIG. 7(a) can be employed for intensity calibration within an illumination pattern as well as across different patterns with variable number of points. For example, FIG. 7(b) shows an intensity corrected PS image corresponding to the raw image shown in FIG. 6(c), indicating remarkable improvement.

Figure 8:
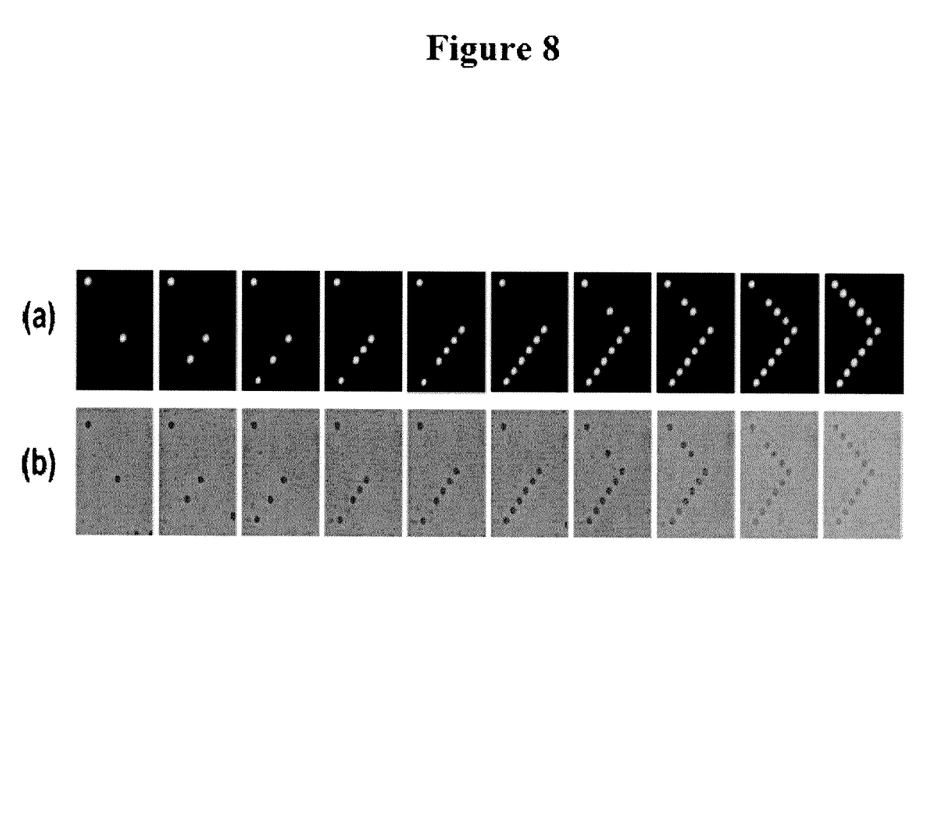
FIGS. 8(a), 8(b). Simultaneous trapping and Raman imaging of 2 to 11 PS microparticles: PS Raman image (a) and visual image (b).
Figure 9:
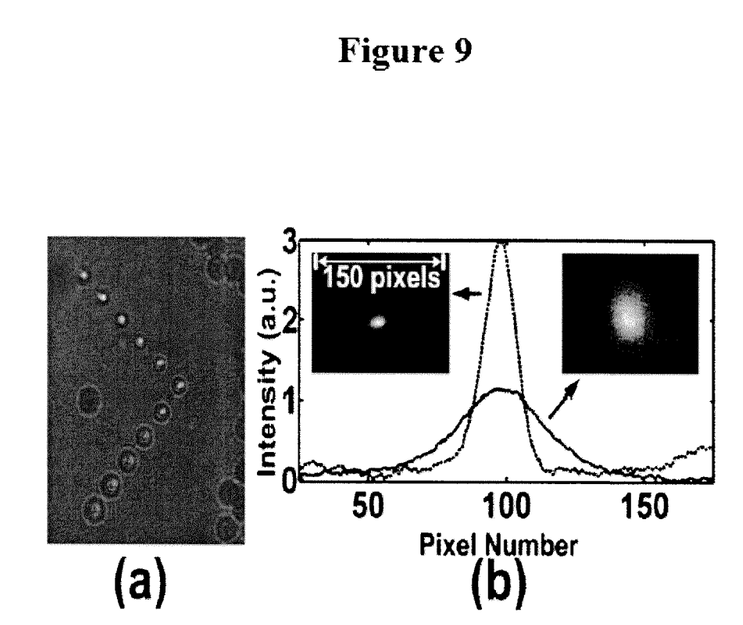
FIGS. 9(a), 9(b). Multiple traps at different depths: (a) laser spots overlaid on 11 PMMA microparticles at different z's; (b) intensity of the in-focus (dotted) and out-of-focus (solid) PMMA microparticles by binning all rows.

Since tightly focused laser spots can readily form optical traps, the proposed scheme can trap multiple polystyrene beads in a non-straight line as shown in FIG. 8(a)-(b). To generate the Raman image, the PS Raman spectrum was employed and the major peak intensity of 1001 cm$^{-1}$ as marked with an asterisk in FIG. 2. Note that a potential advantage of the proposed scheme is its trapping stability against flow due to the 100% illumination duty cycle during trapping, i.e., constant optical gradient was maintained without instantaneous power fluctuations. An on-line movie shows effective trapping against background flow as evidenced by the motion of untrapped microparticles. The proposed scheme can also trap multiple microparticles at different depths as shown in FIG. 9(a) with the raw images of PMMA's Raman peak at 813 cm$^{-1}$ from two beads with 5 μm separation shown in FIG. 9(b). Apparently the spectrum from the out-of-focus bead is blurred, however, this could be improved via deconvolution techniques.

The invention claimed is:

1. An active-illumination parallel Raman microspectroscopy system for multi-point and full-spectral range Raman imaging, comprising:
    a laser;
    a laser line filter configured to purify light from said laser at a desired wavelength;
    a beam expander configured to expand said purified light from said laser line filter;
    a spatial light modulator configured to transform said purified light into spot patterns via diffraction;
    a device comprising at least one objective lens and at least a first tube lens and a second tube lens, said spot patterns passing through said first tube lens and at least one of said objective lens such that said spot patterns excite Raman scattering from said sample producing Raman light, said Raman light passing through at least one of said objective lens and at least said second tube lens;
    a long-wave pass filter to filter said desired wavelength from said Raman light; and
    a spectrograph containing a thermal-electrically cooled charged couple device camera configured to receive said Raman light from said long-wave pass filter, wherein said spectrograph contains a diffraction grating to disperse different wavelengths in different directions, wherein said spectrograph is configured to utilize a selected grating dispersion direction, and wherein said spatial light modulator is configured to generate spot patterns in which no two points are allowed to completely overlap along a direction perpendicular to the selected grating dispersion direction.

2. The system of claim 1, wherein said purified light output from said spatial light modulator is fed through a backport of said objective lens.

3. The system of claim 1, wherein said spatial light modulator is a phase hologram.

4. The system of claim 1, wherein said device is an upright or inverted microscope.

5. The system of claim 1, wherein multiple mirrors reflect said purified light from said beam expander towards said spatial light modulator.

6. The system of claim 1, wherein said long-wave pass filter is a notch filter.

7. The system of claim 1, wherein said first tube lens and said second tube lens are configured to relay said purified light into said objective lens.

8. The system of claim 1, wherein said device contains a dichroic beamsplitter.

9. The dichroic beamsplitter of claim 8, wherein said dichroic beamsplitter is located in a turret of said objective lens.

10. The dichroic beamsplitter of claim 8, wherein said dichroic beamsplitter is configured for epi-Raman acquisition via said objective lens.

11. The system of claim 1, wherein said charged couple device camera is low-noise.

12. An active-illumination parallel Raman microspectroscopy method for multi-point and full-spectral range Raman imaging, comprising:
    emitting light from a laser;
    purifying light from said laser to a desired wavelength utilizing a laser line filter;
    expanding said purified light from said laser line filter utilizing a beam expander;

transforming said purified light from said beam expander into spot patterns via diffraction utilizing a spatial light modulator;

said spot patterns exciting Raman scattering from said sample producing Raman light, said spot patterns passing first through a first tube lens of a device and at least one objective lens of said device, said Raman light then passing through at least one objective lens of said device and at least said second tube lens;

filtering out a desired wavelength from said Raman light utilizing a long-wave pass filter;

sending said filtered Raman light from said long-wave pass filter to a spectrograph, wherein said spectrograph contains a diffraction grating to disperse different wavelengths in different directions, wherein said spectrograph is configured to utilize a selected grating dispersion direction and wherein said spatial ht modulator is configured to generate spot patterns in which no two points are allowed to completely overlap along a direction perpendicular to the selected grating dispersion direction;

generating illumination patterns from said spatial light modulator; and synchronizing and analyzing data from a charged couple device and said spatial light modulator illumination patterns.

* * * * *